United States Patent
Yokohama et al.

(10) Patent No.: US 9,665,224 B2
(45) Date of Patent: May 30, 2017

(54) CAPACITIVE TOUCHSCREEN

(71) Applicant: HOSIDEN CORPORATION, Yao-shi (JP)

(72) Inventors: Kunihiko Yokohama, Yao (JP); Masaya Shimizu, Yao (JP); Hiroyuki Ishikawa, Yao (JP); Naoki Toyota, Yao (JP)

(73) Assignee: HOSIDEN CORPORATION, Yao-shi (JP)

( * ) Notice: Subject to any disclaimer, the term of this patent is extended or adjusted under 35 U.S.C. 154(b) by 0 days.

(21) Appl. No.: 14/736,657

(22) Filed: Jun. 11, 2015

(65) Prior Publication Data
US 2015/0370368 A1 Dec. 24, 2015

(30) Foreign Application Priority Data
Jun. 20, 2014 (JP) .................. 2014-127659

(51) Int. Cl.
*G06F 3/044* (2006.01)

(52) U.S. Cl.
CPC .... *G06F 3/044* (2013.01); *G06F 2203/04111* (2013.01)

(58) Field of Classification Search
CPC ............... G06F 3/044; G06F 2203/04111
See application file for complete search history.

(56) References Cited

U.S. PATENT DOCUMENTS

| | | | |
|---|---|---|---|
| 2004/0119701 A1 | 6/2004 | Mulligan et al. | |
| 2008/0309633 A1* | 12/2008 | Hotelling | G06F 3/0412 345/173 |
| 2011/0012845 A1 | 1/2011 | Rothkopf et al. | |
| 2012/0098787 A1* | 4/2012 | Kim | G06F 3/044 345/174 |
| 2014/0085252 A1 | 3/2014 | Hanssen et al. | |
| 2015/0293636 A1 | 10/2015 | Park et al. | |

FOREIGN PATENT DOCUMENTS

| | | |
|---|---|---|
| JP | 2012-203628 A1 | 10/2012 |
| WO | 2014/088304 A1 | 6/2014 |

OTHER PUBLICATIONS

Extended European Search Report issued on Nov. 4, 2015 for the counterpart European patent application No. 15020081.4.

* cited by examiner

*Primary Examiner* — Latanya Bibbins
(74) *Attorney, Agent, or Firm* — Kratz, Quintos & Hanson, LLP

(57) ABSTRACT

A capacitive touchscreen including a first electrode layer, a second electrode layer, and at least one interlayer interposed between the first electrode layer and the second electrode layer. The first electrode layer includes a plurality of first electrodes, and the first electrodes are arranged at spaced intervals along a first direction. The second electrode layer includes a plurality of second electrodes, and the second electrodes are arranged at spaced intervals along a second direction so as to cross the first electrodes. The second direction crosses the first direction. The at least one interlayer has a thickness set such that a coupling capacitance between each first electrode and each second electrode is between or equal to 0.5 pF and 2 pF.

20 Claims, 3 Drawing Sheets

CAPACITIVE TOUCHSCREEN

CROSS-REFERENCE TO RELATED APPLICATIONS

The present application claims priority under 35 U.S.C. §119 of Japanese Patent Application No. 2014-127659 filed on Jun. 20, 2014, the disclosure of which is expressly incorporated by reference herein in its entity.

BACKGROUND OF THE INVENTION

Technical Field
The invention relates to capacitive touchscreen.
Background Art
Japanese Unexamined Patent Publication No. 2012-203628 discloses a conventional capacitive touchscreen. The touchscreen includes a first substrate, a plurality of first electrodes on the first substrate, a second substrate, and a plurality of second electrodes provided on the second substrate so as to cross the first electrodes.

SUMMARY OF INVENTION

Either the first electrodes or the second electrodes are driving electrodes, and the other are detection electrodes. The detection electrodes are electrically connected to a detection integrated circuit (IC). An amplifier in the detection IC amplifies an output signal from the detection electrodes to improve the responsivity of the touchscreen.

However, in the case where a coupling capacitance value of a given first electrode and a given second electrode provides capacitive coupling of 2 picofarad (pF) or more, signals outputted form the detection electrode and amplified by the amplifier should exceed the upper limit of the detection IC, bringing the detection IC into a saturated state.

In the above circumstances, the invention provides a capacitive touchscreen with improved responsivity and with reduced possibility that a control unit, such as a detection IC, is brought into a saturated state.

A capacitive touchscreen of an aspect of the invention includes a first electrode layer, a second electrode layer, and at least one interlayer interposed between the first electrode layer and the second electrode layer. The first electrode layer includes a plurality of first electrodes, and the first electrodes are arranged at spaced intervals along a first direction. The second electrode layer includes a plurality of second electrodes, and the second electrodes are arranged at spaced intervals along a second direction so as to cross the first electrodes. The second direction crosses the first direction. The at least one interlayer has a thickness set such that a coupling capacitance between each first electrode and each second electrode is between or equal to 0.5 pF and 2 pF.

In the capacitive touchscreen of this aspect, the at least one interlayer separates the first electrodes and the second electrodes such that the coupling capacitance value between each first electrode and each second electrode is between or equal to 0.5 pF and 2 pF. Accordingly, if output signals from the first and/or second electrodes are amplified, the amplified signals are unlikely to exceed the upper limit of a control unit (the control unit is unlikely to be saturated). Therefore, the invention makes it possible to amplify output signals from the first and/or second electrodes and thereby improve the responsivity of the touchscreen.

The first electrode layer may further include a plurality of first wires connected to the first electrodes. The first wires may each include a first parallel portion extending substantially parallel to the second electrodes. The first parallel portions of the first wires may include a closest first parallel portion located closest to the second electrodes. The closest first parallel portion may extend at a minimum distance of 0.4 mm in the second direction from the second electrodes. The second electrode layer may further include a plurality of second wires connected to the second electrodes. The second wires may each include a second parallel portion extending substantially parallel to the first electrodes. The second parallel portions of the second wires may include a closest second parallel portion located closest to the first electrodes. The closest second parallel portion may extend at a minimum distance of 0.8 mm in the second direction from the second electrodes.

The capacitive touchscreen of this aspect can reduce the possibility that coupling capacitance of each first electrode and each second electrode is affected by electrostatic coupling of the closest first parallel portion and at least one of the second electrodes and/or electrostatic coupling of the closest second parallel portion and at least one of the first electrodes.

DESCRIPTION OF EMBODIMENTS

The first to third embodiments of the invention will be described below in detail.

First Embodiment

Figure 1A:
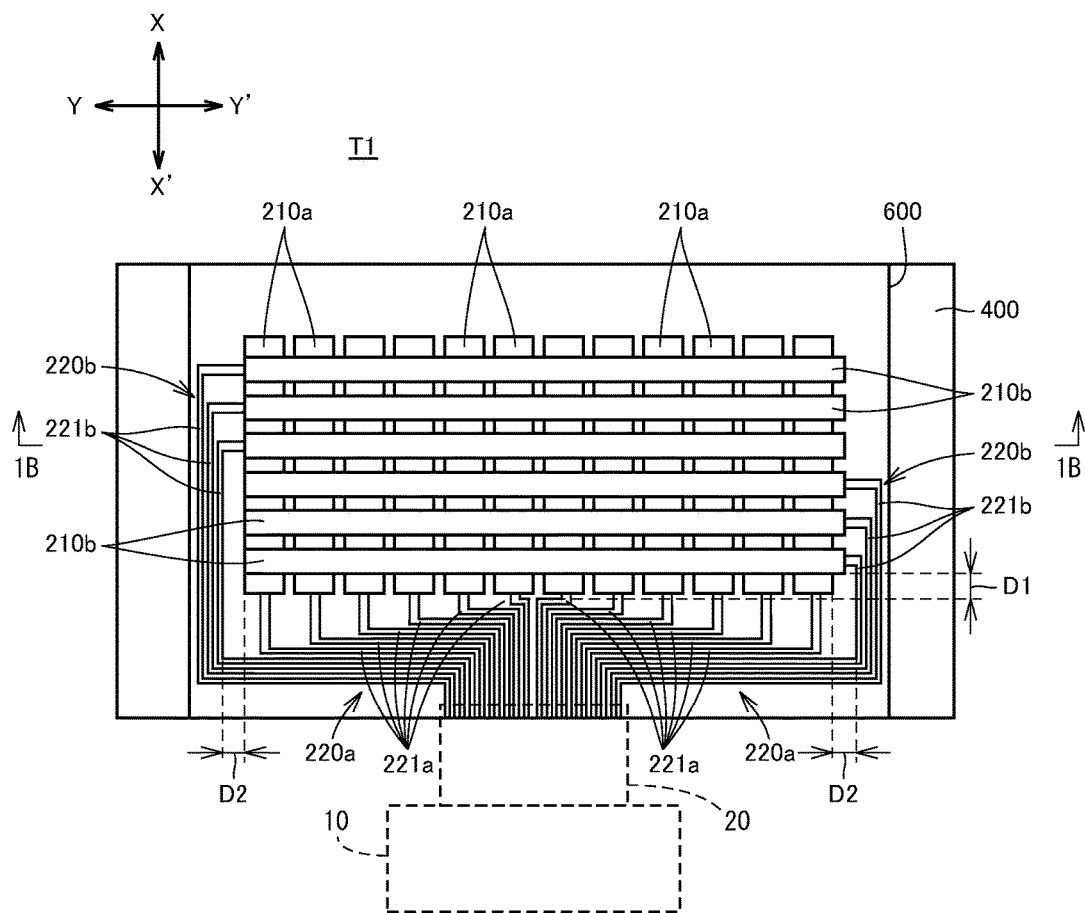
FIG. 1A is a schematic bottom view of a capacitive touchscreen in accordance with the first embodiment of the invention.
Figure 1B:
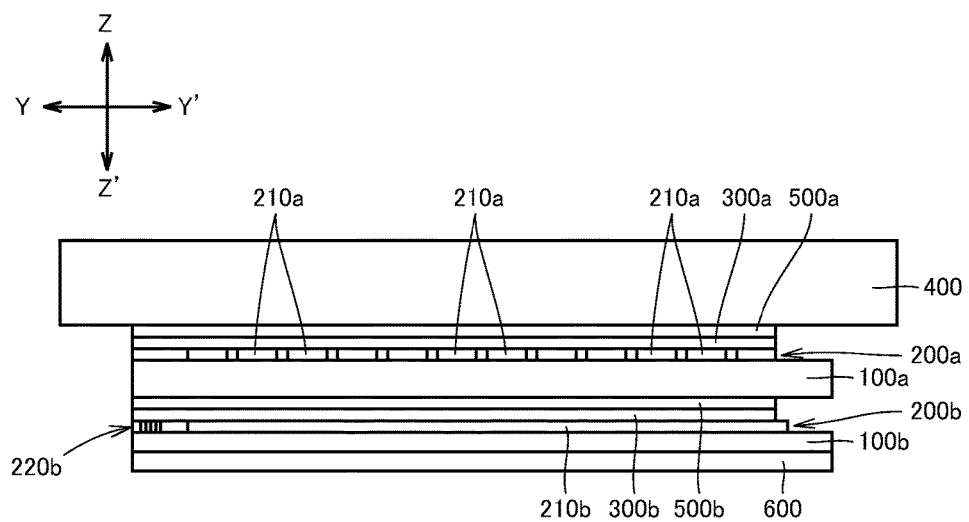
FIG. 1B is a sectional view of the touchscreen taken along 1B-1B in FIG. 1A.

A capacitive touchscreen T1 of the first embodiment of the invention will be described below with reference to FIG. 1A to FIG. 2B. The touchscreen T1 includes a first substrate 100a, a second substrate 100b, a first electrode layer 200a, a second electrode layer 200b, a first protective layer 300a, a second protective layer 300b, a cover panel 400, a first adhesive layer 500a, a second adhesive layer 500b, and a low reflective portion 600. These constituents of the touchscreen T1 will be described below in detail. Y-Y' direction in FIG. 1A to FIG. 1B is the lengthwise direction of the touchscreen T1 and in this embodiment corresponds to the first direction in the claims. X-X' direction in FIG. 1A is the short direction of the touchscreen T1 and in this embodiment corresponds to the second direction in the claims. In other embodiments, the second direction may correspond to a lengthwise direction of the touchscreen, and the first direction may be a shorter dimension of the touchscreen. In yet further embodiments the touchscreen may be square, and the first and second directions may correspond to equal dimensions. Z-Z' direction in FIG. 1B is the thickness direction of the touchscreen T1. The X-X' direction crosses the Y-Y' direction at right angles, and the Z-Z' direction crosses the Y-Y' direction and the X-X' direction at right angles.

The first substrate 100a as illustrated in FIG. 1A to FIG. 2A is a translucent glass sheet or a translucent resin film. The first substrate 100a has a first face and a second face opposite to the first face. The first electrode layer 200a is provided on the first face of the first substrate 100a.

Figure 2A:
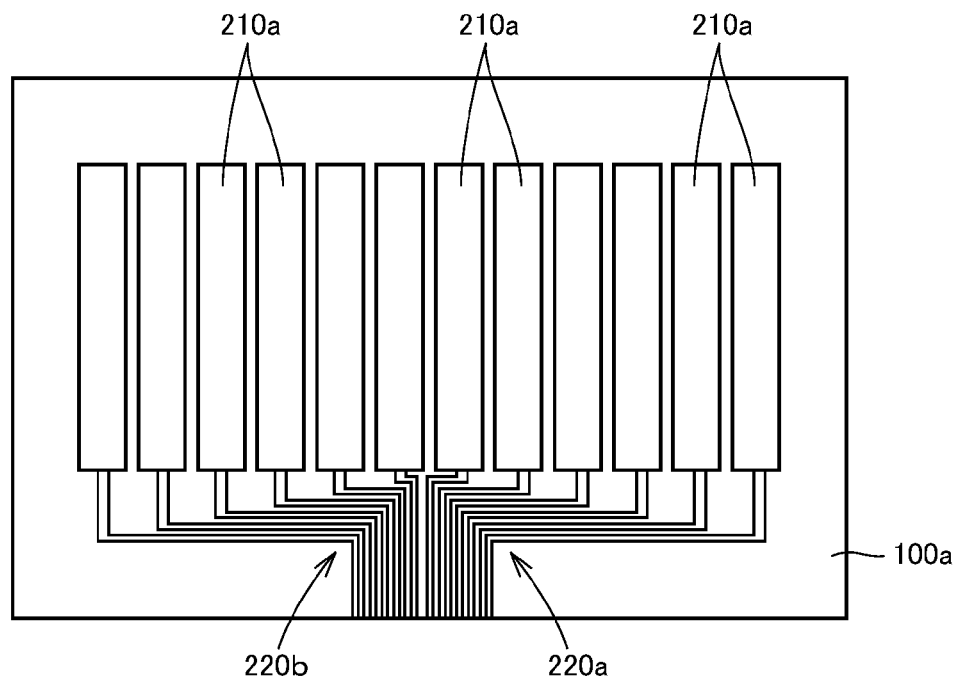
FIG. 2A is a schematic bottom view of a first electrode layer and a first substrate of the touchscreen.

As best illustrated in FIG. 1A and FIG. 2A, the first electrode layer 200a includes a plurality of first electrodes 210a and a plurality of first wires 220a. The first electrodes 210a are detection electrodes (sensor electrodes), extending in the X-X' direction on the first face of the first substrate 100a so as to be arranged at spaced intervals along the Y-Y' direction. The first electrodes 210a may be transparent conductive film strips, conductive wires, or other conductors. The transparent conductive film strips may be formed of tin-doped indium oxide (ITO), indium-doped zinc oxide (IZO), aluminum-doped zinc oxide (AZO), or conductive polymer such as PEDOT and PSS. The conductive wires may be silver (Ag) nanowires or metal wires each having a width of 15 μm or smaller. The conductors may be of photosensitive silver. The conductors may be electrically conductive lines of silver, copper, or other metal, each having a width of 15 μm or smaller, and may be fabricated by graph offset or other method.

The first wires 220a may be transparent conductive film strips, strips of metal (e.g. silver (Ag), molybdenum (Mo), aluminum (Al), or copper (Cu)), strips of metal alloy (e.g. alloys of silver (Ag), palladium (Pd), and/or copper (Cu)), or metal wires. The transparent conductive film strips may be made of the same material as that of the transparent conductive film strips of the first electrodes 210a. The first wires 220a are spaced from each other on the first face of the first substrate 100a and connected to respective ends of the first electrodes 210a. The first wires 220a each include a first parallel portion 221a extending substantially parallel to second electrodes 210b (to be described) of the second electrode layer 200b. At least one of the first parallel portions 221a is located closest to the endmost second electrode 210b located at an end or ends in the X-X' direction. In the first embodiment, two of the first parallel portions 221a are located closest to the endmost second electrode 210b. The closest first parallel portion(s) 221a extend at a distance D1 (projection distance) in the X-X' direction from the endmost second electrode 210b. The distance D1 is set to a distance (e.g. 0.4 mm or larger) with which capacitance of electrostatic coupling C1 is smaller than (equal to or smaller than about ⅒ of) capacitance of electrostatic coupling C2, where C1 is electrostatic coupling between the endmost second electrode 210b and the closest first parallel portion(s) 221a, and C2 is electrostatic coupling of an intersection where the endmost second electrode(s) 210b cross the first electrode 210a connected to the first wire 220a having the associated closest first parallel portion(s) 221a.

The first protective layer 300a is made of translucent and insulating material, such as acrylic. As illustrated in FIG. 1B, the first protective layer 300a is provided on the first electrode layer 200a. The first protective layer 300a may cover the first electrodes 210a and/or the first wires 220a.

The first adhesive layer 500a as illustrated in FIG. 1B is translucent adhesive or a double-sided translucent adhesive tape. The first adhesive layer 500a serves to fix the cover panel 400 to the first protective layer 300a. The cover panel 400 is made of translucent resin or glass. The cover panel 400, if made of resin, may preferably have a dielectric constant of 2.5 to 4 and have a dimension in the Z-Z' direction (thickness) of 2.5 mm or larger. The cover panel 400, if made of glass, may preferably have a dielectric constant of 5 to 7 and have a dimension in the Z-Z' direction (thickness) of 5 mm or larger. An ornamental layer not shown may be provided by applying screen printing or gravure printing onto the cover panel 400 or sticking an ornamental film onto the cover panel 400.

Figure 2B:
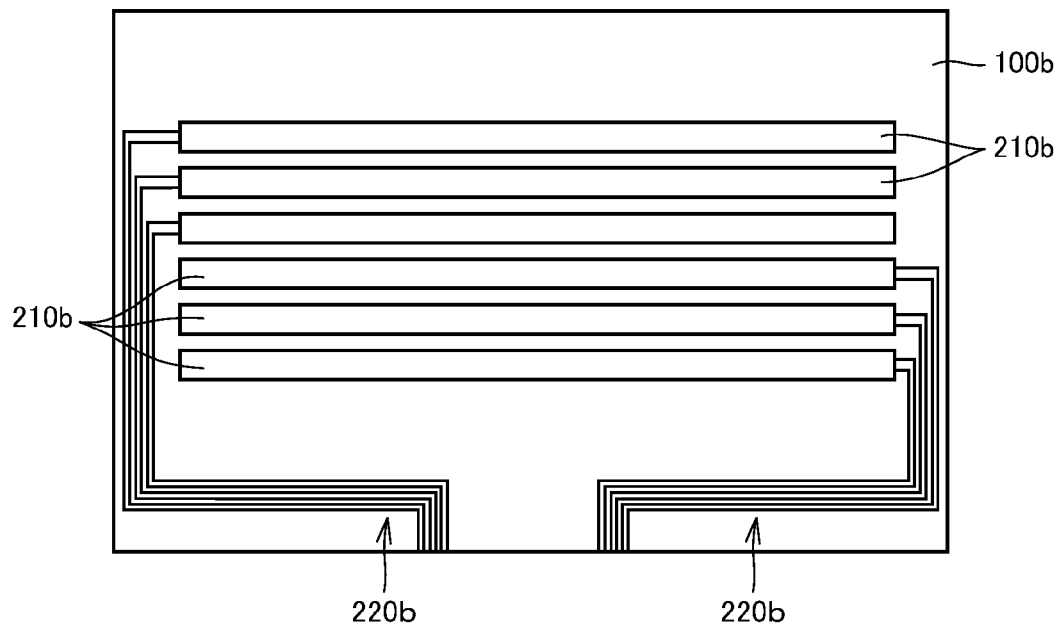
FIG. 2B is a schematic bottom view of a second electrode layer and a second substrate of the touchscreen.

The second substrate 100b as illustrated in FIG. 1A, FIG. 1B, and FIG. 2B is a translucent glass sheet or a translucent resin film. The second substrate 100b has a first face and a second face opposite to the first face. The second electrode layer 200b is provided on the first face of the second substrate 100b. The low reflective portion 600 is provided on the second face of the second substrate 100b. The low reflective portion 600 may be a low reflective (LR) film, an anti-glare (AG) film, an anti-reflection (AR) film, a moth-eye film, or a polarizing plate.

As best illustrated in FIG. 1A and FIG. 2B, the second electrode layer 200b includes a plurality of second electrodes 210b and a plurality of second wires 220b. The second electrodes 210b are driving electrodes (drive electrodes), extending in the Y-Y' direction on the first face of the second substrate 100b so as to be arranged at spaced intervals along the X-X' direction. The second electrodes 210b may be transparent conductive film strips, conductive wires, or other conductors. The second electrodes 210b cross the first electrodes 210a at right angles. The transparent conductive film strips may have the same configuration as the transparent conductive film strips of the first electrodes 210a. The conductive wires may have the same configuration as the conductive wires of the first electrodes 210a. The conductors may have the same configuration as the conductors of the first electrodes 210a. The second electrode layer 200b are capacitively coupled to the first electrode layer 200a.

The second wires 220b may be transparent conductive film strips, strips of metal (e.g. silver (Ag), molybdenum (Mo), aluminum (Al), or copper (Cu)), strips of metal alloy (e.g. alloys of silver (Ag), palladium (Pd), and/or copper (Cu)), or metal wires. The transparent conductive film strips may be made of the same material as the transparent conductive film strips of the second electrodes 210b. The second wires 220b are spaced from each other on the first face of the second substrate 100b and connected to respective ends of the second electrodes 210b. The second wires 220b each include a second parallel portion 221b extending substantially parallel to the first electrodes 210a of the first electrode layer 200a. At least one of the second parallel portions 221b is located closest to the endmost first electrode 210a located at an end or ends in the Y-Y' direction. In the first embodiment, one of the second parallel portions 221b is located closest to the endmost first electrode 210a located at the Y-direction end, and another second parallel portion 221b is located closest to the endmost first electrode 210a located at the Y'-direction end. The closest second parallel portion(s) 221b extend at a distance D2 (projection distance) in the Y-Y' direction from the associated endmost first electrode(s) 210a. The distance D2 is set to a distance (e.g. 0.8 mm or larger) with which capacitance of electrostatic coupling C3 is smaller than (equal to or smaller than about ⅒ of) capacitance of electrostatic coupling C4, where C3 is electrostatic coupling of the endmost first electrode(s) 210a and the associated closest second parallel portion 221b, and the electrostatic coupling C4 is electrostatic coupling of an intersection where the endmost first electrode(s) 210a cross the second electrode 210b connected to the second wire 220b having the associated closest second parallel portion(s) 221b.

The second protective layer 300b is made of translucent and insulating material, such as acrylic. As illustrated in FIG. 1B, the second protective layer 300b is provided on the second electrode layer 200b. The second protective layer 300b may cover the second electrodes 210b and/or the second wires 220b.

The second adhesive layer 500b as illustrated in FIG. 1B is translucent adhesive or a double-sided translucent adhesive tape. The second adhesive layer 500b bonds the second face of the first substrate 100a to the second protective layer 300b.

The first substrate 100a, the second adhesive layer 500b, and the second protective layer 300b (a plurality of interlayers) are interposed between the first electrode layer 200a and the second electrode layer 200b, and the thicknesses of these interlayers are set such that a coupling capacitance between each first electrode 210a and each second electrode 210b is between or equal to 0.5 pF and 2 pF. Considering that output signals from the first electrodes 210a will be amplified as described below, it is more preferable to set the thicknesses of the first substrate 100a, the second adhesive layer 500b, and the second protective layer 300b such that the coupling capacitance between each first electrode 210a and each second electrode 210b is between or equal to 0.5 pF and 1 pF. For example, in the case where the first substrate 100a is made of soda lime glass, the second adhesive layer 500b is a double-sided adhesive tape, and the second protective layer 300b is made of acrylic, it is possible to bring the coupling capacitance between each first electrode 210a and each second electrode 210b into the range between or equal to 0.5 pF and 1 pF by setting the thickness of the first substrate 100a to 0.5 mm or larger, the thickness of the second adhesive layer 500b to 0.05 mm, and the thickness of the second protective layer 300b to 2 nm.

An external connecting member 20 can be fixed to ends of the first substrate 100a and the second substrate 100b and is connected to the first wires 220a and second wires 220b. The external connecting member 20 is a flexible printed circuit (FPC) or the like. The first electrodes 210a can be connected to a control unit 10 (e.g. detection IC) via the first wires 220a and the external connecting member 20. The second electrodes 210b can be connected to the control unit 10 via the second wires 220b and the external connecting member 20. The control unit 10 sequentially supplies driving pulses to the second electrodes 210b, sequentially receive output signals from the first electrodes 210a, and based on the output signals, acquire detection data corresponding to changes in coupling capacitance of each first electrode 210a and each second electrode 210b.

The touchscreen T1 described above has at least the following technical features. First, the plurality of interlayers of thicknesses as described above serve to separate the first electrodes 210a and the second electrode 210b in the Z-Z' direction, bringing the coupling capacitance between each first electrode 210a and each second electrode 210b into the range between or equal to 0.5 pF and 2 pF (more preferably, between or equal to 0.5 pF and 1 pF). Accordingly, if the amplifier in the control unit 10 amplifies output signals from the first electrodes 210a, the amplified signals are unlikely to exceed the upper limit of the control unit 10 (the control unit 10 is unlikely to be saturated). This allows the control unit 10 to amplify output signals from the first electrodes 210a and therefore improves the responsivity of the touchscreen T1.

Second, the touchscreen T1 can provide sufficient responsivity although it includes the first electrodes 210a and the second electrodes 210b separated from each other in the Z-Z' direction in order to bring the coupling capacitance between each first electrode 210a and each second electrode 210b into the range between or equal to 0.5 pF and 2 pF (more preferably, between or equal to 0.5 pF and 1 pF). More specifically, in the touchscreen T1, the first electrodes 210a and the second electrodes 210b are separated from each other in the Z-Z' direction in order to bring the coupling capacitance between each first electrode 210a and each second electrode 210b into the range between or equal to 0.5 pF and 2 pF (more preferably, between or equal to 0.5 pF and 1 pF). This arrangement may cause degradation in responsivity of the touchscreen T1 because coupling capacitance of each first electrode and each second electrode can be adversely affected by electrostatic coupling of the closest first parallel portions 221a of the first wires 220a and the endmost second electrode 210b and/or electrostatic coupling of the closest second parallel portion 221b of the second wires 220b and the endmost first electrode 210a. However, such an adverse effect can be suppressed because the distance D1 and the distance D2 are defined as described above.

Second Embodiment

Figure 3:
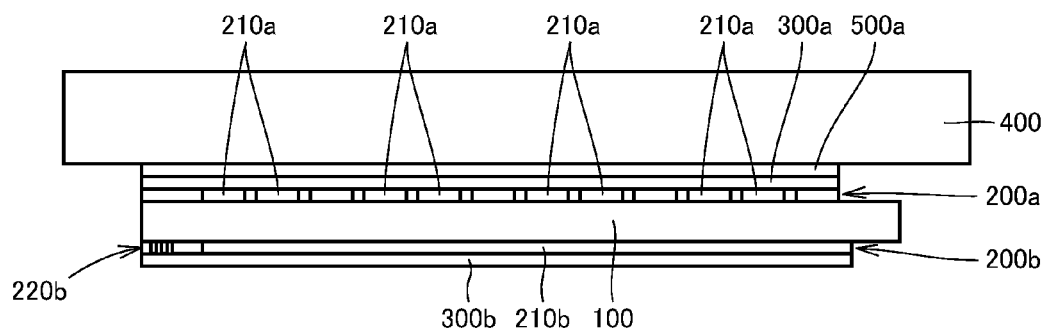
FIG. 3 is a schematic sectional view of a touchscreen in accordance with the second embodiment of the invention, the view corresponding to FIG. 1B.

A capacitive touchscreen T2 of the second embodiment of the invention will be described below with reference to FIG. 3. The touchscreen T2 has a similar configuration as the touchscreen T1 of the first embodiment, except the touchscreen T2 includes a substrate 100 in place of the first substrate 100a and the second substrate 100b and does not include the second adhesive layer 500b or the low reflective portion 600. These differences will be described below in detail, and overlapping descriptions will be omitted.

The substrate 100 is a translucent glass sheet or a translucent resin film. The substrate 100 has a first face and a second face opposite to the first face. The first electrode layer 200a is provided on the first face of the substrate 100. Specifically, the first electrodes 210a of the first electrode layer 200a are arranged at spaced intervals along the Y-Y' direction on the first face of the substrate 100. The first wires (not shown) of the first electrode layer 200a are provided on the first face of the substrate 100. The second electrode layer 200b is provided on the second face of the substrate 100. Specifically, the second electrodes 210b of the second electrode layer 200b are arranged at spaced intervals along the X-X' direction on the second face of the substrate 100 and cross the first electrodes 210a at right angles. The second wires 220b of the second electrode layer 200b are provided on the second face of the substrate 100. An external connecting member 20 (see FIG. 1A) is fixed to the substrate 100 and connected to the first wires and the second wires 220b. The first electrodes 210a can be connected to the control unit 10 (see FIG. 1A) via the first wires and the external connecting member 20. The second electrodes 210b can be connected to the control unit 10 via the second wires 220b and the external connecting member 20.

The second protective layer 300b is made of translucent and insulating material, such as acrylic resin. The second protective layer 300b is provided on the second electrode layer 200b and may cover the second electrodes 210b and/or the second wires 220b from the Z'-direction side. It should be appreciated that the second protective layer 300b can be replaced with the low reflective portion 600. It is also possible to provide the low reflective portion 600 on the second protective layer 300b.

The substrate 100 (one interlayer) is interposed between the first electrode layer 200a and the second electrode layer 200b, and the thickness of this interlayer is set such that a coupling capacitance between each first electrode 210a and each second electrode 210b is between or equal to 0.5 pF and 2 pF (more preferably, between or equal to 0.5 pF and 1 pF).

The touchscreen T2 described above has at least the first and second technical features discussed for the touchscreen T1. Specifically in the touchscreen T2, the one interlayer (substrate 100) of thickness as described above serves to separate the first electrodes 210a and the second electrodes 210b in the Z-Z' direction, bringing the coupling capacitance between each first electrode 210a and each second electrode 210b into the range between or equal to 0.5 pF and 2 pF (more preferably, between or equal to 0.5 pF and 1 pF). Accordingly, if the amplifier in the control unit 10 amplifies output signals from the first electrodes 210a, the amplified signals are unlikely to exceed the upper limit of the control unit 10 (the control unit 10 is unlikely to be saturated).

Third Embodiment

Figure 4:
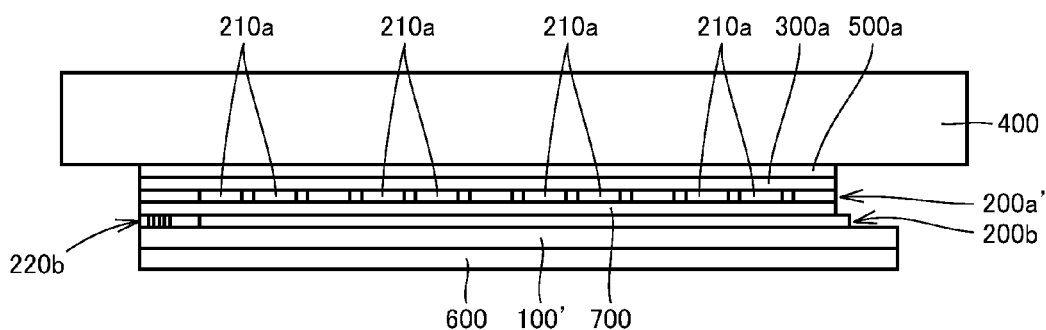
FIG. 4 is a schematic sectional view of a touchscreen in accordance with the third embodiment of the invention, the view corresponding to FIG. 1B.

A capacitive touchscreen T3 of the third embodiment of the invention will be described below with reference to FIG. 4. The touchscreen T3 has a similar configuration as the touchscreen T1 of the first embodiment, except that the touchscreen T3 includes a substrate 100' and an insulating layer 700 in place of the first substrate 100a and the second substrate 100b and does not include the second protective layer 300b or the second adhesive layer 500b. These differences will be described below in detail, and overlapping descriptions will be omitted.

The substrate 100' is a translucent glass sheet or a translucent resin film. The substrate 100' has a first face and a second face opposite to the first face. The second electrode layer 200b is provided on the first face of the substrate 100'. More specifically, the second electrodes 210b of the second electrode layer 200b are arranged at spaced intervals along the X-X' direction on the first face of the substrate 100'. The second wires 220b of the second electrode layer 200b are provided on the first face of the substrate 100'. The low reflective portion 600 is fixed to the second face of the substrate 100'.

The insulating layer 700 is provided on the second electrode layer 200b. A first electrode layer 200a' is provided on the insulating layer 700. Specifically, the first electrodes 210a of the first electrode layer 200a' are arranged at spaced intervals in the Y-Y' direction on the insulating layer 700 so as to cross the second electrodes 210b at right angles. The first wires (not shown) of the first electrode layer 200a' are provided on the first face of the substrate 100'. An external connecting member 20 (see FIG. 1A) is fixed to the substrate 100' and connected to the first wires and the second wires 220b. The first electrodes 210a can be connected to the control unit 10 (see FIG. 1A) via the first wires and the external connecting member 20. The second electrodes 210b can be connected to the control unit 10 via the second wires 220b and the external connecting member 20.

The insulating layer 700 (one interlayer) is interposed between the first electrode layer 200a' and the second electrode layer 200b. The thickness of the insulating layer 700 is set such that coupling capacitance between each first electrode 210a and each second electrode 210b is between or equal to 0.5 pF and 2 pF (more preferably, between or equal to 0.5 pF and 1 pF).

The touchscreen T3 described above has at least the first and second technical features discussed for the touchscreen T1. Specifically in the touchscreen T3, the one interlayer (insulating layer 700) of thickness as described above serves to separate the first electrodes 210a and the second electrodes 210b in the Z-Z' direction, bringing the coupling capacitance between each first electrode 210a and each second electrode 210b into the range between or equal to 0.5 pF and 2 pF (more preferably, between or equal to 0.5 pF and 1 pF). Accordingly, if the amplifier in the control unit amplifies output signals from the first electrodes 210a, the amplified signals are unlikely to exceed the upper limit of the control unit (the control unit is unlikely to be saturated).

The capacitive touchscreen of the invention is not limited to the above embodiments and may be modified in any manner within the scope of the claims. Specific modifications will be described below in detail.

The first electrode layer of the invention may be any layer including a plurality of first electrodes arranged at spaced intervals along the first direction. The second electrode layer of the invention may be may be any layer including a plurality of second electrodes arranged at spaced intervals along the second direction, which crosses the first direction, so as to cross the first electrodes. The first electrodes may be driving electrodes, and the second electrodes may be detection electrodes.

The first wires of the first electrode layer of the invention may be any wires connected to the first electrodes of any aspect described above. The distance D1 may be a distance from the endmost second electrode(s) to the first parallel portion(s) located closest in the second direction to the endmost second electrode(s). The distance D1 may be set such that that capacitance of electrostatic coupling C1 is smaller than (equal to or smaller than about 1/10 of) capacitance of the electrostatic coupling C2, where C1 is electrostatic coupling between the endmost second electrode(s) and the first parallel portion(s) located closest to the endmost second electrode(s), and C2 is electrostatic coupling of an intersection where the endmost second electrode(s) cross the first electrode(s) connected to the first wire(s) having the closest first parallel portion(s). The distance D1 may be 0.4 mm or smaller. Each first wire may not include the first parallel portion.

The second wires of the second electrode layer of the invention may be any wires connected to the second electrodes of any aspect described above. The distance D2 may be a distance from the endmost first electrode(s) to the second parallel portion(s) located closest in the first direction to the endmost first electrode(s). The distance D2 may be set such that capacitance of electrostatic coupling C3 is smaller than (equal to or smaller than about 1/10 of) capacitance of the electrostatic coupling C4, where C3 is electrostatic coupling between the endmost first electrode(s) and the second parallel portion(s) located closest to the endmost first electrode(s), and C4 is electrostatic coupling of an intersection where the endmost first electrode(s) cross and the second electrode(s) connected to the second wire(s) having the closest second parallel portion(s). The distance D2 may be 0.8 mm or smaller. Each second wire may not include the second parallel portion. The first wires and/or the second electrodes of the invention may be omitted in the invention.

The touchscreen of the invention may further include a first index matching layer interposed between the first electrodes and one of the first substrate, the substrate, and the insulating layer of the above embodiments. The first index matching layer may preferably have a refractive index that is larger than that of the first substrate/substrate/insulating layer and smaller than that of the first electrodes. The touchscreen of the invention may further include a second index matching layer interposed between the second electrodes and one of the second substrate and the substrate of the above embodiments. The second index matching may preferably have a refractive index that is larger than that of the first substrate/substrate and smaller than that of the second electrodes.

The at least one interlayer of the invention may be modified in any manner as long as it is interposed between the first electrode layer and the second electrode layer and has a thickness set such that the coupling capacitance between each first electrode and each second electrode is between or equal to 0.5 pF and 2 pF. In other words, it is preferable that the at least one interlayer have a thickness set such that the coupling capacitance between one of the plurality of first electrodes and one of the plurality of second electrodes is between or equal to 0.5 pF and 2 pF (more preferably, between or equal to 0.5 pF and 1 pF).

It is possible to omit the first protective layer, the second protective layer, the cover panel, the first adhesive layer, the second adhesive layer, the external connecting member and/or the low reflective portion in the invention. The external connecting member of the invention may be any member to connect the first and second electrodes to the control unit.

It should be appreciated that the materials, shapes, dimensions, numbers, arrangements, and other configurations of the constituents of capacitive touchscreens in the embodiments and the modification examples may be modified in any manner if they can perform similar functions. The embodiments and modification examples may be combined in any possible manner. The first direction of the invention may be any direction. The second direction of the invention may be any direction crossing the first direction. The direction of the invention may be any direction crossing the first and second directions.

REFERENCE SIGNS LIST

T1: touchscreen
  100a: first substrate
  100b: second substrate
  200a: first electrode layer
    210a: first electrodes
    220a: first wires
      221a: first parallel portions
  200b: second electrode layer
    210b: second electrodes
    220b: second wires
      221b: second parallel portions
  300a: first protective layer
  300b: second protective layer
  400: cover panel
  500a: first adhesive layer
  500b: second adhesive layer
  600: low reflective portion
D1: distance
D2: distance
T2: touchscreen
  100: substrate
T3: touchscreen
  100': substrate
  200a': first electrode layer
  700: insulating layer

The invention claimed is:

1. A capacitive touchscreen, comprising:
a first electrode layer including a plurality of first electrodes, the first electrodes being arranged at spaced intervals along a first direction;
a second electrode layer including a plurality of second electrodes, the second electrodes being arranged at spaced intervals along a second direction so as to cross the first electrodes, the second direction crossing the first direction; and
at least one interlayer interposed between the first electrode layer and the second electrode layer, wherein:
the at least one interlayer has a thickness set such that a coupling capacitance between each first electrode and each second electrode is between or equal to 0.5 pF and 2 pF,
the second electrodes include an endmost second electrode located at an end in the second direction,
the first electrode layer further includes a plurality of first wires connected to the first electrodes, the first wires each including a first parallel portion extending substantially parallel to the second electrodes,
the first parallel portions of the first wires include a closest first parallel portion located closest to the second electrodes, the closest first parallel portion extending at a minimum distance of 0.4 mm in the second direction from the second electrodes, and
a capacitance of a first electrostatic coupling is substantially less than a capacitance of a second electrostatic coupling, where the first electrostatic coupling is between the closest first parallel portion and the endmost second electrode, and the second electrostatic coupling is of an intersection where the endmost second electrode crosses one of the first electrodes connected to one of the first wires having the closest first parallel portion.

2. The capacitive touchscreen according to claim 1, wherein
the at least one interlayer comprises a plurality of interlayers, and
the interlayers have thicknesses set such that a coupling capacitance between each first electrode and each second electrode is between or equal to 0.5 pF and 2 pF.

3. The capacitive touchscreen according to claim 2, wherein the thicknesses of the interlayers are set such that the coupling capacitance between each first electrode and each second electrode is between or equal to 0.5 pF and 1 pF.

4. The capacitive touchscreen according to claim 1, wherein
the second electrode layer further includes a plurality of second wires connected to the second electrodes, the second wires each including a second parallel portion extending substantially parallel to the first electrodes, and
the second parallel portions of the second wires include a closest second parallel portion located closest to the first electrodes, the closest second parallel portion extending at a minimum distance of 0.8 mm in the first direction from the first electrodes.

5. The capacitive touchscreen according to claim 1, wherein the thickness of the at least one interlayer is set such that the coupling capacitance between each first electrode and each second electrode is between or equal to 0.5 pF and 1 pF.

6. The capacitive touchscreen according to claim 1, wherein
the first electrodes are elongated in the second direction, and
the second electrodes are elongated in the first direction.

7. A capacitive touchscreen, comprising:
a first electrode layer including a plurality of first electrodes, the first electrodes being arranged at spaced intervals along a first direction;
a second electrode layer including a plurality of second electrodes, the second electrodes being arranged at spaced intervals along a second direction so as to cross the first electrodes, the second direction crossing the first direction; and
at least one interlayer interposed between the first electrode layer and the second electrode layer, wherein:
the at least one interlayer has a thickness set such that a coupling capacitance between each first electrode and each second electrode is between or equal to 0.5 pF and 2 pF,
the first electrodes include an endmost first electrode located at an end in the first direction,
the second electrode layer further includes a plurality of second wires connected to the second electrodes, the second wires each including a second parallel portion extending substantially parallel to the first electrodes,
the second parallel portions of the second wires include a closest second parallel portion located closest to the first electrodes, the closest second parallel portion extending at a minimum distance of 0.8 mm in the first direction from the first electrodes, and
a capacitance of a first electrostatic coupling is substantially less than a capacitance of a second electrostatic coupling, where the first electrostatic coupling is between the closest second parallel portion and the endmost first electrode, and the second electrostatic coupling is of an intersection where the endmost first electrode crosses one of the second electrodes connected to one of the second wires having the closest second parallel portion.

8. The capacitive touchscreen according to claim 7, wherein
the first electrodes are elongated in the second direction, and
the second electrodes are elongated in the first direction.

9. The capacitive touchscreen according to claim 7, wherein
the at least one interlayer comprises a plurality of interlayers, and
the interlayers have thicknesses set such that a coupling capacitance between each first electrode and each second electrode is between or equal to 0.5 pF and 2 pF.

10. The capacitive touchscreen according to claim 9, wherein the thicknesses of the interlayers are set such that the coupling capacitance between each first electrode and each second electrode is between or equal to 0.5 pF and 1 pF.

11. The capacitive touchscreen according to claim 7, wherein the thickness of the at least one interlayer is set such that the coupling capacitance between each first electrode and each second electrode is between or equal to 0.5 pF and 1 pF.

12. A capacitive touchscreen, comprising:
a first electrode layer including a plurality of first electrodes, the first electrodes being arranged at spaced intervals along a first direction;
a second electrode layer including a plurality of second electrodes, the second electrodes being arranged at spaced intervals along a second direction so as to cross the first electrodes, the second direction crossing the first direction; and
at least one interlayer interposed between the first electrode layer and the second electrode layer, wherein:
the at least one interlayer has a thickness set such that a coupling capacitance between each first electrode and each second electrode is between or equal to 0.5 pF and 2 pF,
the second electrodes include an endmost second electrode located at an end in the second direction,
the first electrode layer further includes a plurality of first wires connected to the first electrodes, the first wires each including a first parallel portion extending substantially parallel to the second electrodes;
the first parallel portions of the first wires include a closest first parallel portion located closest to the second electrodes,
the closest first parallel portion extends at a distance D1 from the endmost second electrode, and
the distance D1 is set such that capacitance of electrostatic coupling C1 is equal to or smaller than about $\frac{1}{10}$ of capacitance of electrostatic coupling C2, where C1 is electrostatic coupling between the closest first parallel portion and the endmost second electrode, and C2 is electrostatic coupling of an intersection where the endmost second electrode crosses one of the first electrodes connected to one of the first wires having the closest first parallel portion.

13. The capacitive touchscreen according to claim 12, wherein
the first electrodes includes an endmost first electrode located at an end in the first direction,
the second electrode layer further includes a plurality of second wires connected to the second electrodes, the second wires each including a second parallel portion extending substantially parallel to the first electrodes,
the second parallel portions of the second wires includes a closest second parallel portion located closest to the first electrodes,
the closest second parallel portion extends at a distance D2 from the endmost first electrode, and
the distance D2 is set such that capacitance of electrostatic coupling C3 is equal to or smaller than about $\frac{1}{10}$ of capacitance of electrostatic coupling C4, where C3 is electrostatic coupling between the closest second parallel portion and the endmost first electrode, and C4 is electrostatic coupling of an intersection where the endmost first electrode crosses one of the second electrodes connected to one of the second wires having the closest second parallel portion.

14. The capacitive touchscreen according to claim 12, wherein
the first electrodes are elongated in the second direction, and
the second electrodes are elongated in the first direction.

15. The capacitive touchscreen according to claim 12, wherein
the at least one interlayer comprises a plurality of interlayers, and
the interlayers have thicknesses set such that a coupling capacitance between each first electrode and each second electrode is between or equal to 0.5 pF and 2 pF.

16. The capacitive touchscreen according to claim 12, wherein the thickness of the at least one interlayer is set such that the coupling capacitance between each first electrode and each second electrode is between or equal to 0.5 pF and 1 pF.

17. A capacitive touchscreen, comprising:
a first electrode layer including a plurality of first electrodes, the first electrodes being arranged at spaced intervals along a first direction;
a second electrode layer including a plurality of second electrodes, the second electrodes being arranged at spaced intervals along a second direction so as to cross the first electrodes, the second direction crossing the first direction; and
at least one interlayer interposed between the first electrode layer and the second electrode layer, wherein:
the at least one interlayer has a thickness set such that a coupling capacitance between each first electrode and each second electrode is between or equal to 0.5 pF and 2 pF,
the first electrodes include an endmost first electrode located at an end in the first direction,
the second electrode layer further includes a plurality of second wires connected to the second electrodes, the second wires each including a second parallel portion extending substantially parallel to the first electrodes,
the second parallel portions of the second wires include a closest second parallel portion located closest to the first electrodes,
the closest second parallel portion extends at a distance D2 from the endmost first electrode, and
the distance D2 is set such that capacitance of electrostatic coupling C3 is equal to or smaller than about 1/10 of capacitance of electrostatic coupling C4, where C3 is electrostatic coupling between the closest second parallel portion and the endmost first electrode, and C4 is electrostatic coupling of an intersection where the endmost first electrode crosses one of the second electrodes connected to one of the second wires having the closest second parallel portion.

18. The capacitive touchscreen according to claim 17, wherein
the first electrodes are elongated in the second direction, and
the second electrodes are elongated in the first direction.

19. The capacitive touchscreen according to claim 17, wherein
the at least one interlayer comprises a plurality of interlayers, and
the interlayers have thicknesses set such that a coupling capacitance between each first electrode and each second electrode is between or equal to 0.5 pF and 2 pF.

20. The capacitive touchscreen according to claim 17, wherein the thickness of the at least one interlayer is set such that the coupling capacitance between each first electrode and each second electrode is between or equal to 0.5 pF and 1 pF.

* * * * *